United States Patent [19]
Thomsen

[11] 4,103,391
[45] Aug. 1, 1978

[54] WHEEL UNIT FOR MOUNTING IN A SUITCASE

[76] Inventor: Hans Thomas Thomsen, Friisvej 10, DK-2635, Ishoj, Denmark

[21] Appl. No.: 810,594

[22] Filed: Jun. 27, 1977

[30] Foreign Application Priority Data

Aug. 19, 1976 [DK] Denmark ............................. 3743/76

[51] Int. Cl.² ............................................. B60B 33/06
[52] U.S. Cl. ............................................ 16/33; 16/34
[58] Field of Search ......................................... 16/29–34, 16/45; 190/18 A; 280/37, 79.1 R

[56] References Cited
U.S. PATENT DOCUMENTS 4,026,569    5/1977    Staal ................................. 16/341 R

FOREIGN PATENT DOCUMENTS 1,481,896    4/1967    France ............................................ 16/30

*Primary Examiner*—Dorsey Newton
*Attorney, Agent, or Firm*—Hill, Gross, Simpson, Van Santen, Steadman, Chiara & Simpson

[57] ABSTRACT

A wheel unit for being mounted in a suitcase comprises a housing which, when installed, has a rectangular chamber that opens to the outside, within which a wheel is retracted under the force of a spring. The wheel is carried on a wheel bracket which is secured to a bearing block suitably movably retained in the housing. To place the same in use, the wheel is pulled against the force of the spring out of the housing, thus correspondingly moving the wheel bracket and bearing block. Assuming a horizontal wheel axis, the wheel and wheel bracket are turned 90° about a vertical axis, and in this extended position, the wheel bracket is received in locking recesses in the housing.

10 Claims, 9 Drawing Figures

Fig. 4
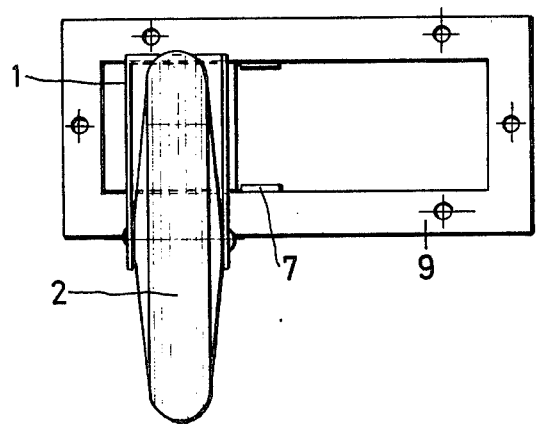
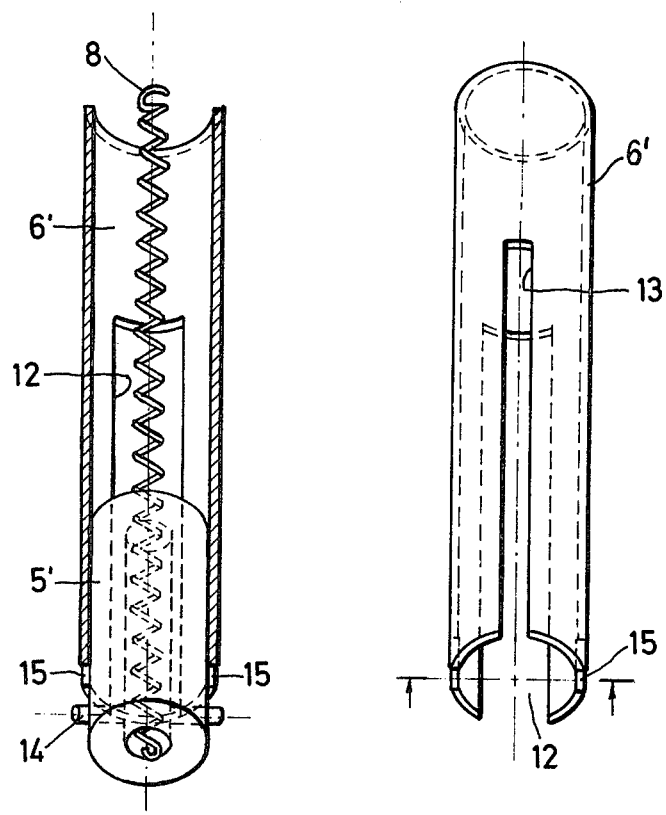
Fig. 5    Fig. 6

U.S. Patent  Aug. 1, 1978  Sheet 4 of 5  4,103,391
Fig. 9
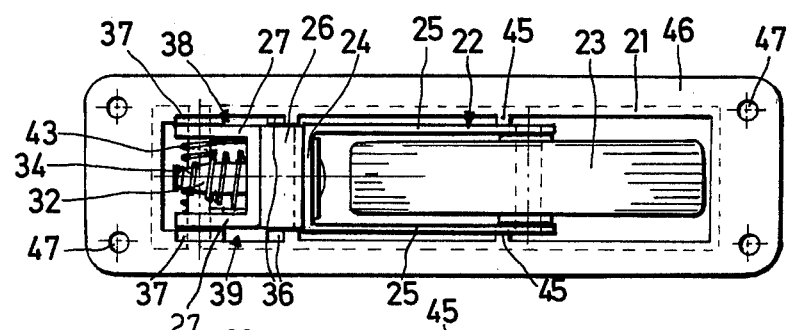
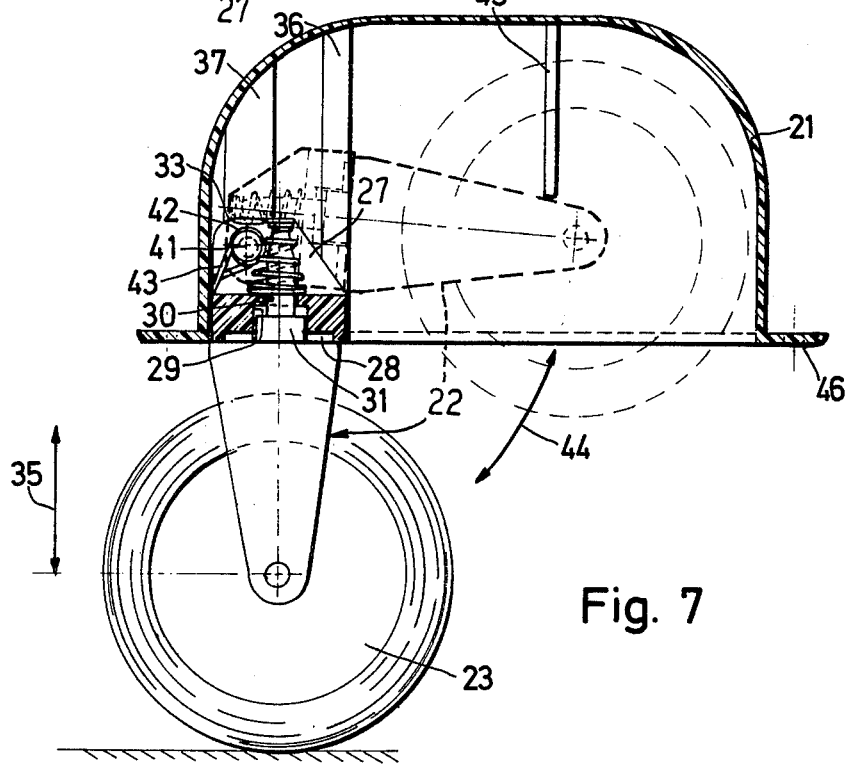
Fig. 7

WHEEL UNIT FOR MOUNTING IN A SUITCASE

BACKGROUND OF THE INVENTION

1. Field of the Invention

This invention relates to a wheel unit for mounting in a suitcase comprising a bifurcated wheel bracket movable in and out of a hole in the one end of a housing.

2. Prior Art

Units of this type hitherto known are usually provided with rather complicated locking mechanisms which are difficult for the user to handle.

SUMMARY OF THE INVENTION

The object of the present invention is to improve the system of locking means for locking the wheel in a driving position in which the wheel is placed at a certain distance from the suitcase wall, and the bracket of the wheel is locked in a position turned 90° in relation to the longitudinal direction of the housing.

Another object of the invention is to provide a wheel unit in which the wheel bracket automatically is retracted into the housing by a 90° turn when the driving position is no longer used, whereby the manipulation of the unit is greatly facilitated.

The wheel unit has a wheel bracket which is rotatably mounted in a bearing block actuated by a spring for introduction of the wheel bracket into a housing, and the wheel bracket in driving position is turned 90° in relation to the bearing block and is locked in recesses situated in the side edges of the housing.

Many other advantages features and additional objects of the present invention will become manifest to those versed in the art upon making reference to the detailed description and the accompanying sheets of drawings in which preferred structural embodiments, incorporating the principles of the present invention are shown by way of illustrative example.

ON THE DRAWINGS

FIG. 4 is a bottom view of FIG. 2;

FIG. 5 is a perspective view of another embodiment of the bearing block and the guide channel, partly broken away;

FIG. 6 is a perspective view of the guide channel of FIG. 5;

FIG. 7 is a side view of another embodiment of the invention partly in cross-section;

FIG. 9 is a bottom view of FIG. 7 with the wheel retracted into the housing.

AS SHOWN ON THE DRAWINGS

Figure 1:
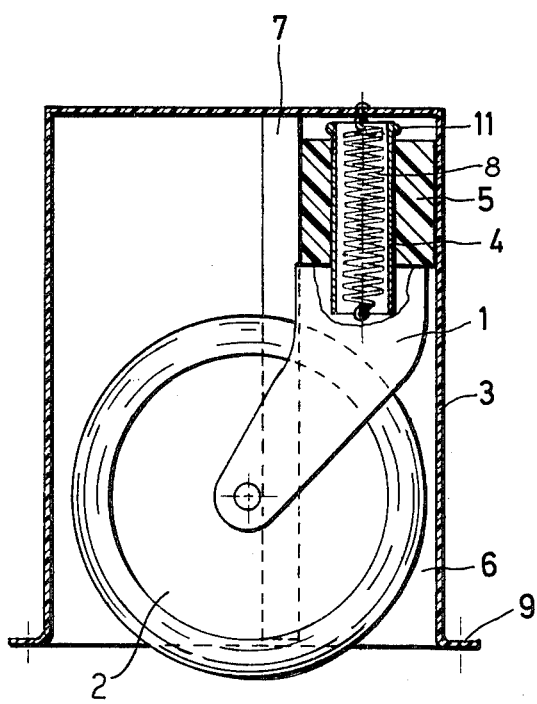
FIG. 1 is a side view of an embodiment of the unit according to the invention with the wheel bracket in retracted position, partly in cross-section.
Figures 2, 3:
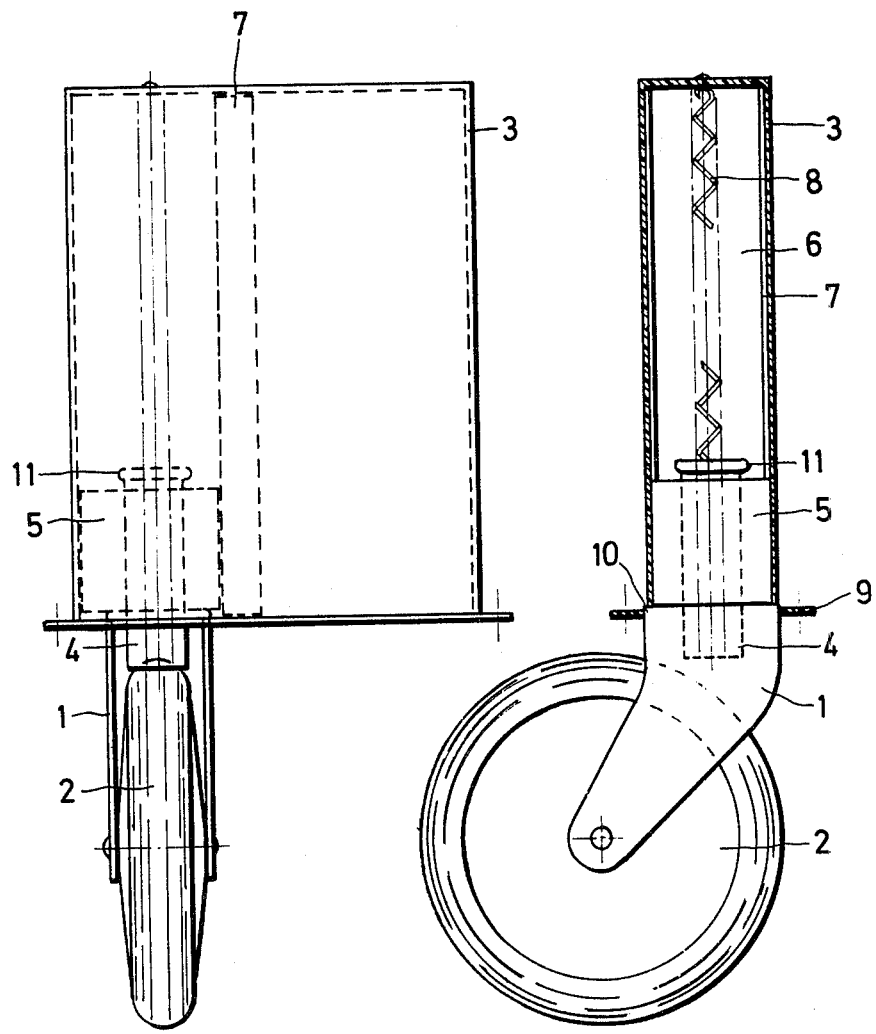
FIG. 2 shows the wheel bracket in extended and turned position.
FIG. 3 is a side view of FIG. 2.

The unit shown in FIGS. 1 to 4 comprises a wheel bracket 1 with a smooth-running wheel 2, the wheel in retracted position being embraced by a housing 3. The wheel bracket 1 is secured at one end of a tube 4 passing through a hole in the web of the wheel bracket and extending a distance between the legs of the wheel bracket. The part of the tube 4 situated above the wheel bracket passes through a bore in a bearing block 5 which is prismatic, i.e. is a polyhedron, and which can slide in a guide channel 6 in the direction of the tube axis. The bore of the bearing block has a size that enables the tube 4 to slide and turn therein. The guide channel 6 comprises three side walls of the housing 3 and two guide rails 7 placed inside and secured to the opposite side walls of the housing.

One end of a tension spring 8 is attached to the closed end of the housing 3, and the other end of the spring is attached to the lower end of the tube 4, the spring extending through said tube.

Around its opening, the housing 3 is provided with a mounting flange 9 for securing the unit. The flange 9 will abut the outside wall of a suitcase and a frame (not shown) corresponding to the suitcase opening is placed on the inner wall of the suitcase and thereafter, the parts are connected, for instance by means of rivets. On the longitudinal sides of the flange at the guide channel 6 there are recesses or notches 10 (FIG. 3) corresponding in size to the web of the wheel bracket, so that in its turned position, said web can be held in these recesses under the force of the tension spring 8.

The tube 4 extends a distance above the bearing block 5, and at this end it is provided with a collar 11. When the wheel bracket is pulled, the bearing block 5 will follow along the channel 6.

In the retracted position of FIG. 1 the tension spring 8 holds the bearing block 5 and the wheel bracket 1 in position inside the housing 3. By pulling on the wheel 2, the wheel bracket 1 and the lower end of the tube 4 slide out of the housing. When the entire wheel bracket is free of the opening of the housing 3, the wheel bracket 1 is turned 90° and released, and the spring 8 retracts the web of the wheel bracket into the recesses 10, whereby a stable positioning of the wheel bracket 1 is obtained. The bearing block 5 and the tube 4 fixed to the wheel bracket provide the unit with a stock-resistant rigidity which can resist, for instance, bumping into curbs or driving up stairs. When use of the wheels is no longer required, the wheel bracket is turned 90° back whereupon the tension spring 8 will retract the wheel bracket 1 with the bearing block 5 up into the guide channel 6, so that only a small part of the wheel 2 extends outside the opening of the suitcase.

FIGS. 5 and 6 show a tubular embodiment of a guide channel 6', that may be used with a cylindrical bearing block 5'.

At one end of the tube, there is a cutout 12 of such a width that the wheel bracket is capable of sliding therein, and diametrically opposite the cutout 12 there is a second cutout 13 slidably receptive of one end of a pin 14 carried near the lower edge of the bearing block 5' and extending in the direction of the wheel.

When the wheel is extended from the position shown in FIG. 1 the wheel bracket 1 and one end of the pin 14 slide in the cutout 12 and the other end of the pin 14 extending in the opposite direction slides in the cutout 13.

The lower end of the tube is also provided with two notches 15.

When the wheel bracket is pulled out of the tube it is turned 90° and thereafter, the spring 8 retracts the bearing block, and the extending ends of the pin 14 are received in the notches 15 as shown by the arrows in FIG. 6.

Figure 8:
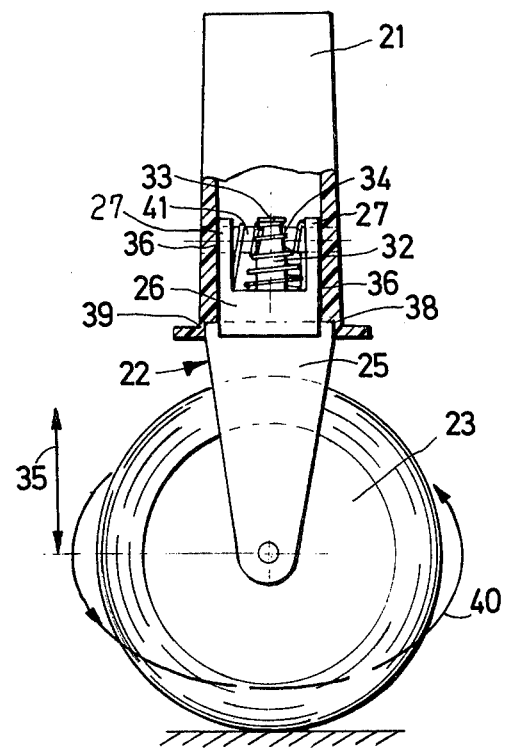
FIG. 8 is an end view of FIG. 7 with the wheel turned 90°.

The unit of FIGS. 7 to 9 comprises a housing 21, a bracket 22 and a wheel 23 rotatably supported therein. The bracket 22 has a rectangular web 24 connecting a pair of branches 25, and the shorter dimension of said web extends in the same direction as the shaft of the wheel 23.

The bracket 22 is supported for rotation and axial sliding in a bearing block 26 having two ears 27.

The bearing block 26 has a transverse slot or recess 28, a counter-bore 29 and a hole 30. The width of the recess 28 corresponds to the shorter dimension of the web 24 of the bracket 22. The bore 29 is a guide member for a bearing or bushing 31 placed on the web, while the hole 30 receives a pin 32 secured to the web and extending beyond the bushing 31. The free end of the pin 32 extends between the ears 27 of the bearing block and is tapered, and at its outer end it is provided with a stop flange 33. A conical compression spring 34 acts between the stop flange 33 and the bearing block 26.

The bracket 22 can be turned around the axis of the bushing 31 in the bore 29, and concurrently, it is slidable for a short distance against the spring tension in the direction of the axis of such turning, as shown by the arrow 35.

When the bracket 22 has been turned 90° from the position shown in FIG. 7 to the position shown in FIG. 8, the spring 34 will pull the web 24 of the bracket 22 into the slot 28, as the size of this side of the web corresponds to the width of said slot.

Inside the housing 21, there are supported two acts of ribs or wall reinforcements 36 and 37 having recesses 38 and 39 at the opening of the housing, into which recesses the web 24 of the bracket abuts in the seated position in the slot 28.

When the bracket 22 is to be retracted, it is necessary first to pull the bracket out of the slot 28 and the recesses 38 and 39 at the opening of the housing, after which it can be turned either along the arrow 40 or in an opposite direction.

The bearing block 26 is pivotally supported on a shaft 41 secured to the side walls of the housing 21 and passing through holes 42 in the ears 27 of the bearing block 26. A torsion spring 43 carried on the shaft 41 acts between the housing 21 and the bearing block 26 and urges the wheel 23, bracket 22 and bearing block 26 to pivot to the position indicated by dotted lines in FIG. 7. Thus, the wheel 23 can be pivoted in and out of the housing along the arrow 44. A pair of stop ribs 45 are supported on the inside of the side walls of the housing, thereby limiting the retracting movement of the wheel bracket. Thus, the position of the wheel and bracket part shown in FIG. 7 with solid lines is not a stable position.

The housing 21 has an edge flange 46 with holes 47 for mounting in a suitcase in a suitable opening, where the attaching may be done by means of, for instance, rivets.

One or preferably two units are mounted in a suitcase. To use them, the projecting wheels 23 are pulled out from the housing and are turned 90°, whereby the bracket 22 by means of the spring 34 is seated in the seat 28 and the recesses 38 and 39. When the wheel or the wheels no longer are in use, the wheel is pulled and again turned 90°, after which the bracket with the wheel swings into the housing due to the influence of the spring 43. When the turning axis passes through the wheel axis, it is of no importance which way the wheel bracket is turned, clockwise or counter-clockwise, and the user may employ either direction of turning.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A wheel unit for use in a suitcase, comprising:
   (a) a housing adapted to be secured to the suitcase, and having an outwardly directed opening, said housing having a guide channel at one end, and there being locking recesses within said housing adjacent to one end of said channel at said opening;
   (b) a bearing block movably supported on said housing, and slidable linearly in said guide channel, said bearing block having a cross-section corresponding to that of said guide channel;
   (c) a wheel bracket having a connection with said bearing block for movement therewith, and said connection also enabling said bracket to be turned with respect to said housing, a portion of said bracket in response to 90° of such turning being receivable in said locking recesses in said housing;
   (d) a wheel rotatably carried on said wheel bracket and being movable between a retracted position substantially inside said housing and an extended position outside said housing; and
   (e) a spring reacting against said housing and biasing said bearing block, said wheel bracket and said wheel to urge said wheel toward said retracted position.

2. A wheel unit according to claim 1, said portion of said wheel bracket received in said locking recesses being a rectangular web, the shorter dimension of which being parallel to the rotational axis of said wheel.

3. A wheel unit according to claim 1, said guide channel having a rectangular cross-section defined by three side walls of said housing and a pair of spaced guide rails secured to the inner faces of opposite ones of said side walls, and said wheel bracket and wheel being receivable between said guide rails.

4. A wheel unit according to claim 1, said guide channel having a circular cross-section defined by a tube secured in said housing, said tube having a cutout of a width corresponding to the width of said wheel bracket taken in the direction of the rotational axis of the wheel, said wheel bracket being receivable in said cutout.

5. A wheel unit according to claim 4, including a lock pin projecting radially from said bearing block, said locking recesses comprising notches in the end of said tube receptive of said lock pin, said notches being spaced 90° from said cutout.

6. A wheel unit for use in a suitcase, comprising:
   (a) a housing adapted to be secured to the suitcase, and having an outwardly directed opening with locking recesses adjacent thereto;
   (b) a bearing block in said housing;
   (c) a shaft pivotally supporting said bearing block and carried by opposite side walls of said housing;
   (d) a wheel bracket having a connection with said bearing block for pivotal movement therewith, and said connection also enabling said bracket to be turned with respect to said housing, a portion of said bracket in response to 90° of such turning being receivable in said locking recesses in said housing;
   (e) a wheel rotatably carried on said wheel bracket and being movable between a retracted position substantially inside said housing and an extended position outside said housing;

(f) a torsion spring reacting against said housing and urging said bearing block, said wheel bracket and said wheel to pivot said wheel toward said retracted position;

(g) said connection between said bearing block and said wheel bracket further enabling the movement of said wheel bracket into and out of said recesses; and (h) a further spring acting between said bearing block and said wheel bracket for maintaining the latter in said recesses.

7. A wheel unit according to claim 6, said portion of said wheel bracket received in said locking recesses being a rectangular web, the shorter dimension of which being parallel to the rotational axis of said wheel.

8. A wheel unit according to claim 6, said bearing block having a slot facing said wheel bracket and snugly receptive of said wheel bracket when the latter is positioned to be received in said recesses.

9. A wheel unit according to claim 6, said connection comprising a guide spindle secured to said wheel bracket and passing through said bearing block, a stop flange secured to the free end of said guide spindle, said further spring being a compression spring disposed around said guide spindle and engaging said stop flange and said bearing block.

10. A wheel unit according to claim 6, the turning axis of said wheelbracket intersecting the rotational axis of said wheel.

* * * * *